Figure 1:
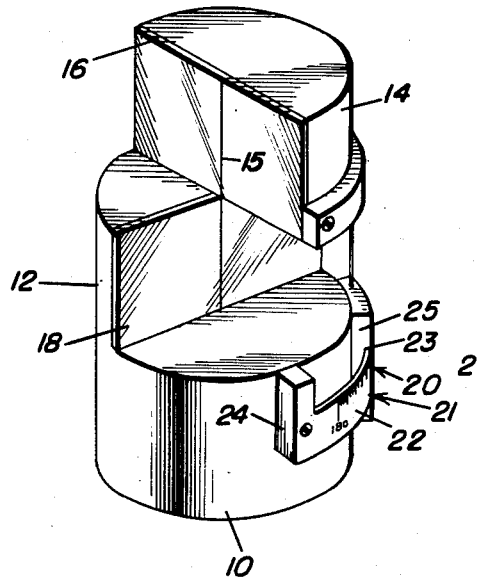

Aug. 13, 1957     V. J. WHITMARSH     2,802,389

REFLECTING ANGLE MEASURING SURVEYING INSTRUMENT

Filed Aug. 3, 1953

Vincent J. Whitmarsh
INVENTOR.

BY *[signatures]*
Attorneys

United States Patent Office 2,802,389
Patented Aug. 13, 1957

2,802,389

REFLECTING ANGLE MEASURING SURVEYING INSTRUMENT

Vincent J. Whitmarsh, Santa Cruz, Calif.

Application August 3, 1953, Serial No. 371,921

9 Claims. (Cl. 88—2.2)

This invention relates to geodetical surveying instruments and more particularly to angle measuring instruments and it has for its main object to provide a simple effective and easily manipulated reflecting instrument for measuring or for laying out angles quickly and with a degree of accuracy which corresponds to that required by the usual field work.

Angle measuring is usually carried out with tachymeters and theodolites and whenever special instruments are provided, they usually have angularly movable and adjustable telescopes, the adjustment of which requires great care. Further, these instruments require rather skilled handling and their adjustment is time consuming.

Reflecting instruments have also been proposed, the instruments having reflecting surfaces the angular position of which is adjustable, which adjustments determine the angle to be measured. This type of instrument lacks however in accuracy, the accuracy being far below that required for field work.

It is the object of this invention to provide a small and easily handled instrument of the reflecting type which permits measuring or laying off of angles, using reflecting surfaces having a fixed relative position and operating with a relatively high accuracy, which instrument may also be used for other purposes such as the aligning of a point with a fixed line determined by fixed objects, which instrument is therefore especially useful for topographical work, for taking cross sections and for reconnaissance.

A further object of the invention consists in providing a light weight instrument with fixed reflecting surfaces permitting to make angle measurements without telescopic equipment, the movable parts being of small size and weight and readily displaceable, thus facilitating and accelerating accurate adjustment.

A further object of the invention consists in providing an angle measuring instrument essentially based on reflecting surfaces in fixed relative position, reflecting the image of the objects, the angle of which relatively to a base line has to be determined, this angle being measured by means of an element slidable on a scale along the instrument, the image of which also appears in one reflecting surface simultaneously with the image of the above named objects.

Further objects of the invention will be apparent from the following detailed specification.

The invention is illustrated in the accompanying drawing showing one embodiment thereof. It is however to be understood that the embodiment of the invention which is illustrated in the drawing is shown by way of example only in order to illustrate the principle of the invention and the best mode of applying this principle. The example shown is therefore not to be considered as limitative and a departure from the construction illustrated is therefore not necessarily a departure from the principle of the invention.

Figure 2:
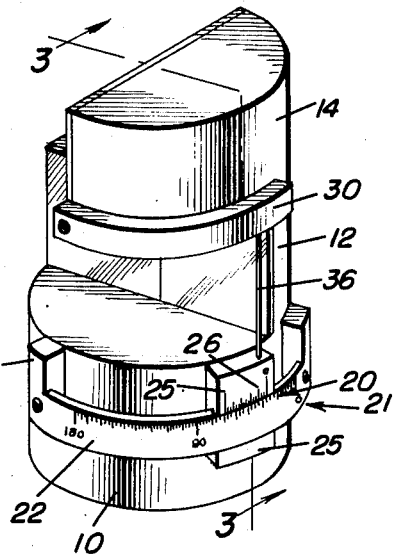
Figure 5:
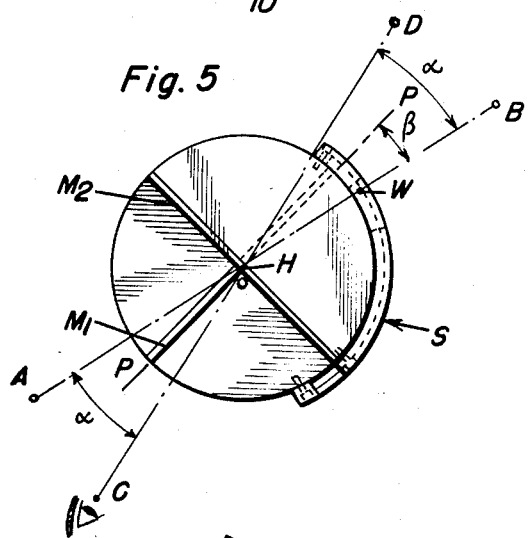
Figure 3:
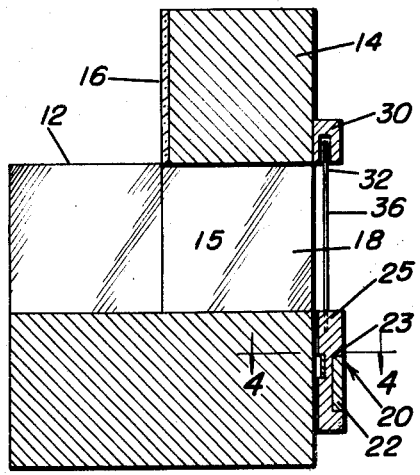
Figure 4:
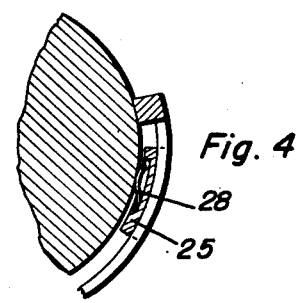

In the drawing:

Figure 1 is an isometric view of the instrument,

Figure 2 is an isometric view of the instrument in another position viewed after having been turned through an angle of 90°, Figure 3 is an elevational sectional view of the instrument, the section being taken along line 3—3 of Figure 2, Figure 4 is a fragmentary sectional plan view, the fragmentary section being taken along line 4—4 of Figure 3, Figure 5 is essentially a diagrammatic view illustrating the instrument in plan view and simultaneously illustrating the geometrical and optical principles on which the invention is based.

The principle on which the invention is based consists in using two reflecting devices, arranged at right angles to each other in a fixed position relatively to each other and so arranged one above each other that the reflecting surfaces cross each other, the reflecting surfaces of the two devices having at least one line in common. This line may be marked as a hairline on the instrument.

The principle of the invention will be best understood by referring to Figure 5 in which the two reflecting surfaces or mirrors are indicated by $M_1$ and $M_2$, while the hairline (indicated in Figure 1 by 15) is indicated in Figure 5 by the reference H. An observer C, observing the coincidence of an object A, such as a surveyor's stave or pole with the hairline H may measure the angular position of the object relatively to the base line C—O—D by reading the angle between this base line and one of the reflecting surfaces $M_1$ or $M_2$. The measurement of this angle may be performed by means of a movable indicator W in the shape of a wire or the like, angularly slidable along an arcuate scale S surrounding the instrument and preferably provided with a vernier, the image of the wire W on the reflecting surface being brought to coincidence with the image of the object A the angular position of which is to be determined and with the hairline H.

Obviously the angle between the base position C—O—D and the line O—A passing through the object A is equal to the angle C—O—A indicated at $\alpha$ (Figure 5).

According to optical principles the object A when seen in the mirror $M_2$ in coincidence with hairline H by the observer C, is at an angle $\beta$ relatively to the base line C—O—D which is equal to $\alpha/2$, $\beta$ being the angle between the ray A—O impinging on the mirror or reflecting surface $M_2$, and reflecting surface $M_1$ which is at right angles to $M_2$ and therefore is in a plane containing the perpendicular drawn to the reflecting point O and bisecting angle $\alpha$.

In order to measure the angle, the movable indicator W is moved to a position in which it is located on the line A—O—B which line is an extension of the ray A—O and in which therefore the image of the indicator W is seen by the observer C in the reflecting surface $M_1$ in coincidence with the hairline H.

The angle $\beta$ may be read on the scale S indicating the angular displacement of the indicator W relatively to the zero point of the scale located in the plane of the surface $M_1$ (perpendicular to surface $M_2$) reflecting the image of the indicator towards the observer. The angle can now be read on the scale, if necessary by means of a vernier attached to or otherwise connected with the indicator W.

It will thus be seen that by using the optical principle of reflection and by using two reflecting surfaces or mirrors at right angles to each other, angular measurements may be made by means of an angularly displaceable indicating member on the instruments which is brought into proper optical relationship with one of the reflecting surfaces.

Referring now to the construction of the instrument shown in Figures 1, 2, 3 and 4 it will be seen that the instrument comprises the instrument body 10 which may be a body of rotation, for instance a cylinder which carries the two half cylindrical carrier bodies 12—14 for the two reflecting surfaces 16, 18. The half cylindrical carrier bodies 12 and 14 are coaxial with the cylindrical instrument body 10 or, preferably, are a portion of the cylindrical body, and are so arranged one above the other that the sectional planes of the half cylinders intersect each other at right angles.

The planar face of each half cylinder 12, 14 is provided with a silvered mirror surface 16, 18 which may be a separate unit attached to the carrier body. The point at which the two mirrored surfaces cross each other is located precisely in the axis of the cylindrical instrument body 10. The hairline 15 is drawn along the axis of the cylinder and marks the line which the two reflecting surfaces have in common.

The instrument body carries a scale member 21 with the graduation scale 20 which may cover an arc of 90°, sufficient for all customary measurements, but which may also cover an extended arc if desired. The scale is preferably applied on or engraved along the upper or lower edge of the arcuate strip 22 which is mounted on two blocks 24 which hold the strip 22 in a position in which it is spaced from the instrument body 10 but is parallel thereto. Along this scale a slide 25, provided with a vernier graduation may be moved, the latter graduation cooperating with the graduation 20 on the member 22.

The slide 25 consists of a block provided with a groove 23 accommodating the strip 22 the downwardly reaching portion of the block filling the space between the strip 22 and the instrument body 10 and being thus firmly guided along the cylinder surface of the body 10 on the one hand and the strip 22 on the other hand.

Alternatively if an elastic guiding is desirable, a small leaf spring 38 may be inserted on the rear side of the block 25 which presses against the cylindrical instrument 10 and holds the slide block firmly pressed against the strip member 22 along which it moves.

The block 25 carries an upwardly projecting indicating wire 36 which is preferably of a length nearly equal to but somewhat in excess of the width of the mirrored surface 18. This wire may reach upwardly and may have a projecting free end, but to avoid vibration and to protect the wire against accidental deformation a slotted part 30 may be arranged, consisting of an arcuate piece, preferably fixed to the body 14 which is provided with an arcuate slot 32. The guard member 30 is approximately of the same arcuate length as the scale member 21 and the slot 32 is of the length of the scale, thus permitting a movement of the indicating wire along the entire scale.

The scale may be a normal scale indicating the angle but is preferably a special scale provided with a compressed graduation divided into 180° along an arc of 90° for a purpose indicated below.

During the actual use of the instrument if the angular position of the object A (Figure 5)—say a surveyor's stave or pole—relatively to a base line has to be measured the operator places himself on the base line C—D while the instrument is placed with its center O on said base line and turned until the object A is bisected with the hairline H (15, Figure 1). To determine the angle $\beta$, the operator moves the slide 25 on the scale strip 22 until the indicator wire 36 is bisected by or in coincidence with the hairline H (15, Figure 1), in mirror 18.

The operator now reads the scale using the vernier 26 for greater accuracy and thus determines the angular distance of the indicator wire 36 (W, Figure 5) relatively to the point of departure of the scale which, as above explained is coincident with the plane of the surface 18. This angle, indicated at $\beta$, for obvious optical reasons is exactly one-half of the angle $\alpha$ between the line A—O—B and the base line C—O—D. If the scale 20 therefore shows a compressed graduation with the multiplication factor of 2 so that 180° are indicated on a scale which comprises only an angle of 90° the angle $\alpha$ may be directly read on the scale.

It will be clear from the position of the two reflecting surfaces that that measurement of angles below 180° is made with one of the two reflecting mirror surfaces, $M_2$ for example, while the measuring of angles between 180° through 360° is performed by means of the second mirror surface $M_1$; it is therefore possible to cover angles of any size and even angles which cover approximately 360°.

If an angle has to be laid out, the procedure is similar but the operation is reversed. After having staked out the base line, the reflecting surface corresponding to the angle to be laid out is first adjusted relatively to the base line by means of the indicator or wire 36 the scale and the vernier and after having brought the indicating wire into its position the surveyor's pole or stave marking the angle to be laid out is then carried to such a point that the hairline bisects the image of the stave or pole. The stave or pole and the axis of the instrument marked by the hairline can determine the exact direction of the line drawn at the desired angle with respect to the base line.

The instrument may also be used in addition for determining alignment of a point marked by the instrument with a line passing through two fixed points, marked, for instance, by surveyor's poles. The instrument in this case is brought to a point in which both surveyor's poles are visible by coincidence with the hairline 15 in the two mirroring surfaces. Likewise the reverse operation for aligning two points with a fixed point so that all three points are in a straight line may be carried out in the manner indicated.

It will thus be seen that an easily manipulated light weight instrument is provided for the surveyor permitting a relatively high accuracy which is mainly dependent on the scale connected with the instrument and which permits a number of measurements which hitherto have only been possible either by using much more elaborate methods or by using instruments of a more complex type which require great skill, thus especially facilitating topographical work or the taking of cross sections and also general orientation and reconnaissance.

It will be clear that changes of an unessential nature may be made without in any way departing from the essence of the invention as defined in the annexed claims.

What is claimed as new is as follows:

1. An angle measuring surveying instrument, comprising two superposed reflecting surfaces crossing each other and at right angles to each other, both being arranged at right angles to the plane in which the angle is to be measured, said reflecting surfaces having a line in common, said line being marked on both surfaces, on of said reflecting surfaces facing the object, the angular position of which is measured, and the observer, the other reflecting surface facing an indicator including an indicator member movable along an angular scale, the starting point of which is fixedly related to the plane of the last named reflecting surface, the angular position of the indicator member, when simultaneous coincidence of the object and of the indicator member with a portion of the common line of the respective reflecting surfaces is obtained, indicating the angular position of the object relatively to the observer's position when viewed from a center positioned in the common line of the reflecting surfaces.

2. An angle measuring instrument comprising cooperating reflecting surfaces at right angles to each other, crossing each other so as to have a line in common along which a mark is provided on each of the reflecting surfaces, one of the reflecting surfaces being adapted to be turned toward the object the angular position of which is to be measured, an arcuate indicator carrier encircling the common line of the reflecting surfaces, a manually movable indicator member on said indicator carrier, and a graduation scale along said carrier, one of said reflecting surfaces, when reflecting the image of the object towards an observer in coincidence with the mark along the common line of the reflector surfaces, being at an angle relatively to the direction determined by the position of the observer and of the common line of the reflecting surfaces, the magnitude of which is indicated by the movable indicator member when shifted into such a position that its image is viewable in another reflecting surface in coincidence with the common line.

3. An angle measuring instrument comprising two superposed reflecting mirror surfaces at right angles to each other and crossing each other having a line in common, said line being provided with a hairline mark, an arcuate slideway arranged in a plane perpendicular to the common line of the reflecting surfaces along a circle the center of which is located in the common line of the reflecting surfaces, a manually shiftable indicator member facing one of the reflecting mirror surfaces but movable along said slideway, and a scale, the reference point of which is fixedly related to the plane of one of the reflecting mirror surfaces for measuring the angular position of the indicator member, the angular position of an object viewed by an observer in one of the reflecting mirror surfaces in coincidence with the hairline relatively to the direction joining the observer and the common line of the reflecting mirror surfaces being measured by displacing the movable indicator member in front of the other reflecting mirror surface until its image is coincident with the hairline in said other reflecting mirror surface, and by measuring the angle between the indicator member position and the last named reflecting mirror surface on the said scale.

4. An angle measuring instrument as claimed in claim 1, wherein two half cylindrical bodies with planar faces at right angles to each other are supported by a cylindrical body and cross each other in the axis of the cylinder, said planar faces forming the reflecting surfaces, and wherein the slideway surrounds the cylindrical body, and a slide is arranged on said slideway supporting said indicator member, said slide being simultaneously provided with a vernier cooperating with the scale.

5. An angle measuring instrument as claimed in claim 4, wherein the slideway is arcuate and is carried by but is spaced from the cylindrical body, and wherein a slide having an arcuate body is arranged between the cylindrical body and the arcuate slideway, a portion of the slide projecting from said space outwardly and wherein a scale graduation is provided on the outside of the slideway, while the projecting portion of the slide is provided with a vernier graduation on its outside arranged substantially in the cylindrical surface of the slideway which carries the scale.

6. An angle measuring instrument as claimed in claim 1, wherein the slideway is arcuate and is carried by but spaced from the cylindrical body, and wherein one of the reflecting mirror surfaces is carried by a half cylindrical body arranged coaxially with the cylindrical body and wherein the angle indicator member is formed by a wire parallel to the axis of the cylindrical body and of a length approximately equal to the width of the reflecting surface in front of which it is movable, a slide carrying the said wire and sliding on the slideway an arcuate angular scale graduation on the outside of the slideway, said slide filling the space between the latter and the cylindrical body, a vernier on the outside of the slide carrying the wire, and a guide member on the half cylindrical body, said guide member being provided with a slot guiding the end of the axially projecting wire.

7. An angle measuring instrument as claimed in claim 1, wherein the arcuate slideway is provided with a compressed scale graduation, in which the arc section occupied by the scale is divided into twice the number of degrees corresponding actually to the said arc section in order to be able to read directly on the scale the angle between the line passing through a given object and the base line running through the point of observation.

8. An angle measuring instrument as claimed in claim 1, wherein the zero mark of the scale coincides with a plane passing through the reflecting mirror in front of which the movable indicator member is moved.

9. An angle measuring instrument for determining the angular position of an object relatively to a base line, comprising two reflecting mirror surfaces, crossing each other at right angles, and having one line in common, each reflecting mirror surface being provided with a fixed hairline, said fixed hairlines of the two mirrors being coincident with the common line, a circular arcuate graduation scale extending in front of the reflecting side of one of the mirrors and fixedly attached to the said mirror, said graduation scale forming a slideway, and a movable member slidable along said slideway carrying a linear indicator member which moves in front of the mirror to which the graduation scale is attached, the reflected image of which, when viewed in the mirror in front of which it moves by the observer, forming a movable hairline adapted to be brought into coincidence with a fixed hairline of the mirror in front of which it moves, the position of coincidence determining the relative angular position between the mirror surface and the base line connecting the observer and the fixed hairlines forming the common line of the reflecting surfaces.

References Cited in the file of this patent

UNITED STATES PATENTS

| | | |
|---|---|---|
| 1,381,520 | Tonnessen | June 14, 1921 |
| 1,551,182 | Venetta | Aug. 25, 1925 |
| 2,335,066 | Lamar | Nov. 23, 1943 |

FOREIGN PATENTS

| | | |
|---|---|---|
| 761,995 | France | Jan. 18, 1934 |